June 17, 1952
J. A. HURRY ET AL
2,600,775
METHOD AND APPARATUS FOR MAKING AND CURING
POWER TRANSMISSION BELTS
Filed Dec. 27, 1950
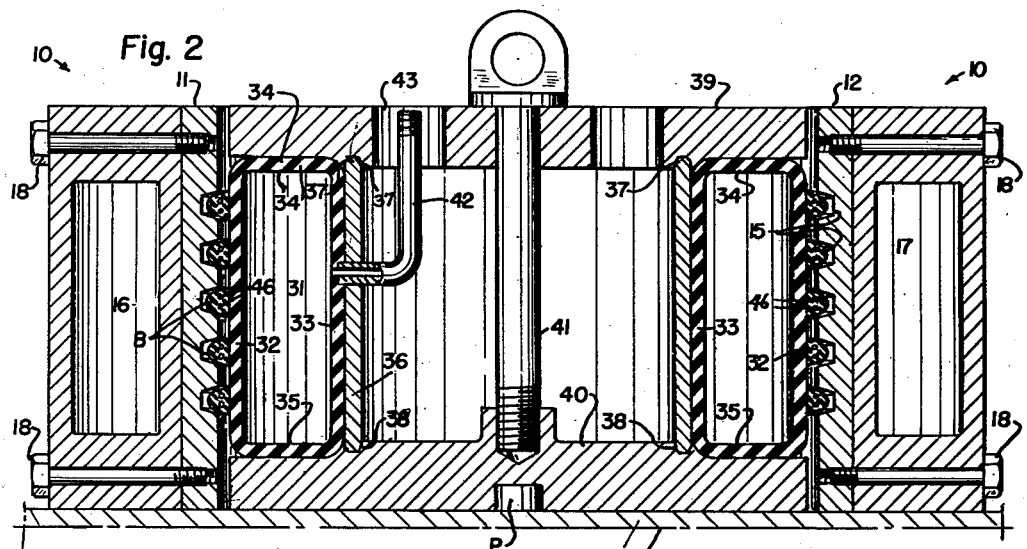
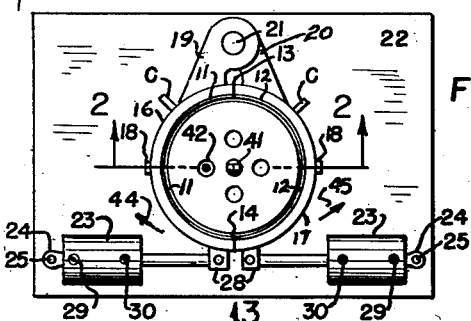
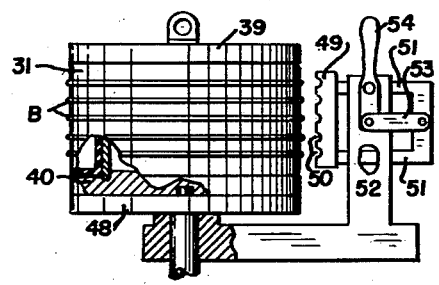
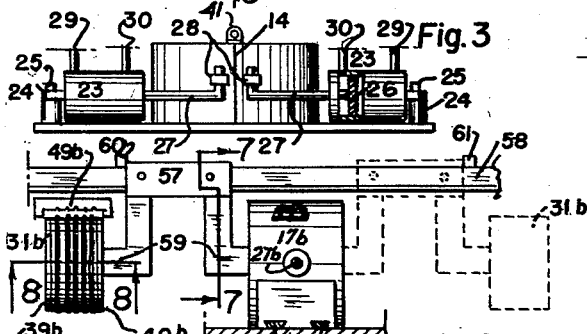
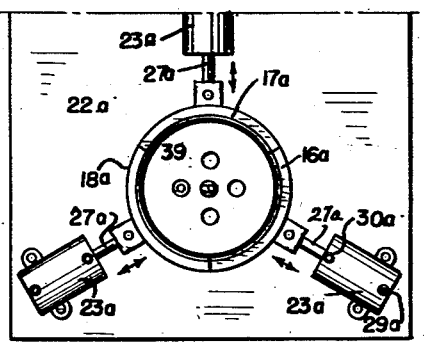
Inventors
JAMES A. HURRY
ERNEST NASSIMBENE
Anderson & Muller
Attorneys Patented June 17, 1952

2,600,775

UNITED STATES PATENT OFFICE 2,600,775

METHOD AND APPARATUS FOR MAKING AND CURING POWER TRANSMISSION BELTS

James A. Hurry and Ernest Nassimbene, Denver, Colo., assignors to The Gates Rubber Company, Denver, Colo., a corporation of Colorado Application December 27, 1950, Serial No. 202,842

8 Claims. (Cl. 18—34)

This invention relates to improved methods and apparatus for making and curing power transmission belts and more particularly to methods and apparatus of the type disclosed in the copending applications of James A. Hurry, Serial Nos. 756,738, now abandoned, and 18,824, now Patent No. 2,573,643, filed August 2, 1947 and April 3, 1948, respectively, of which the present invention is a continuation-in-part.

In the identified copending applications, methods and apparatus are disclosed with which endless belts are cured in a mold in inverted position so that the tension core of the belt may be pre-tensioned while being cured, thus producing a belt in which the stretch will be minimized when in use. This method and apparatus have been found very satisfactory and produce greatly improved belts.

Among the objects of the present invention are to provide improved methods and apparatus for facilitating the loading of one or more belts in an endless mold.

Another object is to provide a method by which a plurality of belts may be simultaneously loaded in the mold cavities.

A further object is to provide method and apparatus utilizing an expansible wall upon which belts may be disposed in the same relative spacing as the mold cavities, and with which a plurality of belts may be simultaneously loaded in the mold.

Still further objects, advantages, and salient features will become more apparent from a consideration of the description to follow, the appended claims, and the accompanying drawing in which:

Figure 1 is a top plan of apparatus employed in effecting the method;

Figure 2 is an enlarged section taken on line 2—2, Figure 1, showing a loading bag positioned in the mold;

Figure 3 is a side elevation of Figure 1, portions being broken away, in the direction of arrow 3;

Figure 4 is a side elevation, portions being broken away, showing apparatus and method for positioning a plurality of belts on an expansible bag;

Figure 5 is a top plan, similar to Figure 1, showing an alternative form of the invention;

Figure 6 is a section taken on line 6—6, Figure 7, showing another alternative form of the invention, a portion being broken away;

Figure 7 is a section taken on line 7—7, Figure 6; and

Figure 8 is an enlarged section taken on line 8—8, Figure 6.

Referring in detail to the drawing, and particularly Figures 1 to 3, the mold 10, employed for curing the belts, comprises a pair of semicircular mold halves 11, 12 which form, when in closed position, an annular mold split longitudinally along edges 13, 14. Spaced parallel grooves 15 of suitable shape, such as the shape of a cured V-belt, extend around the inner walls of the mold halves to form endless belt forming and curing cavities. Steam jackets 16, 17 are secured to mold halves 11, 12, respectively, in any suitable manner, such by screws 18. Jackets 16, 17 are provided, respectively, with hinge members 19, 20 pivotally secured together by a hinge pin 21, the lower end of which is secured to base plate 22. Double acting actuating cylinders 23, one for each half of the mold, are pivotally secured to base plate 22 by bosses 24 and pins 25, the lower ends of the latter being fixed to the base plate. Each cylinder slideably receives a piston 26 connected to a piston rod 27, the free ends of the latter each being pivotally connected to bosses 28 secured to the jacket halves. Conduits 29 connect to one end of each cylinder and conduits 30 to the other end. Suitable valves (not shown) permit fluid to be admitted to the outer ends of the cylinders for actuating the mold halves to the closed position shown and other similar valve means permit fluid to be admitted to the inner ends of the cylinders for actuating the mold halves to open position when the fluid in the outer ends is permitted to be released.

The loading bag 31, best shown in Figure 2, is formed of rubber, or rubber-like material, and has two annular walls 32, 33, closed at their upper and lower edges by end walls 34, 35, respectively. The inner wall 33 surrounds a circular metallic tube 36, the upper and lower edges of which have chamfers 37, 38, which fit, respectively, into corresponding circular grooves in top and bottom plates 39, 40, the plates being secured to the tube by an eye bolt 41. A conduit 42 is secured to the bag and projects into tube 36 where its end is accessible through an aperture 43 in plate 39 for connection to a source of fluid pressure, such as air or steam, or any suitable liquid, such as water.

At the beginning of a curing operation the two halves of the mold will be swung outwardly in the direction of arrows 44, 45 by actuators 23. The bag assembly will be located at a loading station and a plurality of belts will be positioned on the outer wall of bag 34 in the same spaced relation as the spacing of the cavities in the mold. The bag is then inserted between the mold halves and centered on pin P. The two halves of the mold are then swung to closed position by actuators 23, as shown in Figures 1 to 3, to securely lock them together with edges 13, 14, tightly abutting to prevent any "flash" of rubber during the cure. The bag is then inflated through conduit 42 which simultaneously forces all of the belts outwardly, seating them in the mold cavities.

As shown in Figure 1, each jacket half is provided with a conduit C, connected by flexible or other conduits (not shown) to a steam source. Steam may also be supplied to bag 31 through conduit 42 to thus apply heat to all sides of the belts. The outward pressure of the bag on the belts during curing enables them to move outwardly and completely fill the cavities, and this, of course, uniformly tensions the flexible tension cores 46, or the like, which extend circumferentially around the belts B.

The positioning of the belts on the bag is illustrated in Figure 4 wherein the belts are slipped over it, while it is slightly inflated, and positioned in their approximate correct positions, the bag being disposed on a turntable 48 during this process. A combing plate 49 having spaced grooves 50 therein is moved toward the belts as the turntable and bag are rotated and the bag slowly inflated. This combs or moves the belts into exact position so that they will register with the mold cavities when the bag is subsequently disposed within the mold. The comb may be supported by guides 51, slidably mounted in a support 52, and actuated by a link 53 and lever 54.

In Figure 5 is shown an alternative form of the invention in which the construction is essentially the same as previously described except that the mold is formed in three sections 16a, 17a, 18a rather than two, and is actuated by three actuators 23a in the directions of movement of their piston rods 27a, as shown by the double arrows adjacent thereto.

In Figures 6 to 8, another alternative form of the invention is illustrated. In this construction, the axis of the mold is disposed horizontally rather than vertically, the halves 16b, 17b being supported on base plate 22b for rectilinear movement toward and away from each other along guides 56 by actuators 23b. A trolley 57 is movable along a rail 58 and is provided with oppositely extending arms 59, each having secured thereto a bag assembly 31b. As shown in Figure 6, the left bag assembly 31b is outside of the mold while the right bag is in the mold. During the curing, the left bag is loaded with belts as previously described and a comb 49b moved around the bag thus properly positioning them thereon. Suitable stops 60, 61 on the rail provide means for limiting trolley movement and thus aligning the belts with the respective cavities in which they are to be cured.

When the curing is completed, actuators 23b move the two halves of the mold apart. The trolley is then moved to the dotted line position and the mold again closed. During this operation the belts are removed from the right bag and a new set positioned thereon as previously described. When curing is completed, the mold is opened, the trolley returned to its original position, and the mold again closed, which completes a cycle of operation. In this construction, end plates 39, 40, previously described, are dispensed with and the bag is constructed as shown in Figure 8, wherein its ends are supported from unauthorized movement by flanges 39b, 40b on tube 36b.

The constructions so far described, wherein steam is applied to the mold jacket and/or the bag during curing, are best adapted for large heavy molds, that is, equipment which cannot be readily moved. For smaller molds, it will be apparent that the power actuators may be omitted and the mold closed manually, as for example, by placing suitable handles on the mold sections, such as in the region of bosses 28 in Figure 1. Any suitable latching device to lock the mold sections together may then be employed. With smaller molds of this type, the steam jacket may be omitted and the entire mold disposed in a steam kettle in the same manner disclosed in the previously identified applications, the steam being maintained at suitable pressure and curing temperature and the interior of the bag being maintained under a higher fluid pressure to force the belts outwardly into the cavities.

As previously described, the mold sections are detachably connected to their respective steam jackets. When it is desired to cure a belt of different length, the sections are removed and replaced with other sections having cavities of the desired length, the bag assembly also being replaced by another assembly corresponding to the replaced sections. The particular bag assembly is exemplary only and any other suitable expanding wall device may be employed such as the type disclosed in the identified copending applications wherein a flexible sleeve is disposed around a metallic sleeve, the former being sealingly secured at its ends to the latter and fluid admitted to the space between the two sleeves.

What is claimed as new is:

1. The method of loading a plurality of endless belts in a plurality of endless parallel spaced cavities having the open sides thereof facing inwardly, which includes the steps of positioning the belts on an expansible wall in the same spaced relation as the cavities, positioning the wall with the spaced belts thereon in alignment with the respective cavities in which they are to be cured, and expanding the wall to simultaneously force the belts into their respective cavities.

2. The method of loading a plurality of endless power transmission V-belts in a plurality of parallel spaced outwardly narrowing curing cavities having the open sides thereof facing inwardly, which includes the steps of positioning the belts on an expansible wall in the same spaced relation as the cavities, with the narrow sides of the belts facing outwardly from the wall, positioning the wall with the spaced belts thereon in alignment with the respective cavities in which they are to be cured, and expanding the wall to simultaneously force the belts into their respective cavities.

3. The method of loading a plurality of endless power transmission belts in a plurality of endless parallel spaced curing cavities formed in the inner surface of a hollow mold made of a plurality of complementary segmental sections that are moveable relatively to each other from closed to open position and so related that the cavities register and become endless when the mold sections are in closed position, which includes the steps of positioning the belts on the outer surface of an endless expansible wall in the same spaced relation as the cavities, positioning the wall and belts between the separated sections of the open mold, moving the mold sections to closed position, retaining the mold sections in closed position, and expanding the wall while in a position relative to the cavities with the belts in alignment with the respective cavities in which they are to be cured to simultaneously force the belts into their respective cavities.

4. The method of loading a plurality of endless power transmission belts in a hollow longitudinally split multipart mold, the parts of the mold when in closed position having a plurality of endless parallel spaced curing cavities having open sides thereof facing inwardly, which includes the steps of positioning the belts on an expansible wall in the same spaced relation as the cavities, opening the mold, positioning the wall with the spaced belts thereon in the open mold, closing the mold and retaining it in closed position, and expanding the wall while in a position relative to the mold with the belts in alignment with the respective cavities in which they are to be cured to simultaneously force the belts into their respective cavities.

5. The method of loading and curing a plurality of endless power transmission belts in a hollow longitudinally split multi-part mold, the parts of the mold when in closed position having a plurality of endless parallel spaced curing cavities having open sides thereof facing inwardly, which includes the steps of positioning the belts on an expansible wall in the same spaced relation as the cavities, opening the mold, positioning the wall with the spaced belts thereon in the open mold, closing the mold and retaining it in closed position, expanding the wall while in a position relative to the mold with the belts in alignment with the respective cavities in which they are to be cured to simultaneously force and seat the belts in their respective cavities, thereafter applying an outwardly directed uniformly distributed force to the inner walls of the belts normal thereto at all points further forcing them outwardly into the cavities, and subjecting the belts to a curing temperature while applying the uniformly distributed force.

6. Apparatus for loading and curing a plurality of endless power transmission belts in a hollow longitudinally split multi-part mold, the parts of the mold when in closed position having a plurality of endless parallel spaced curing cavities having open sides thereof facing inwardly, comprising in combination therewith, an expansible wall upon which the belts may be positioned in the same spaced relation as the cavities, and means for positioning the belts on the wall in said spaced relation while the wall is disposed outside of the mold, and means for positioning the wall with the belts thereon within the mold with the belts in alignment with the respective cavities in which they are to be cured.

7. The method of loading a plurality of endless belts in a plurality of endless parallel spaced cavities having the open sides thereof facing inwardly, which includes the steps of positioning the belts on an expansible wall in the same spaced relation as the cavities, positioning the wall with the spaced belts thereon in alignment with the respective cavities in which they are to be cured, and effecting relative movement between the wall and the cavities to simultaneously dispose the belts in their respective cavities.

8. The method of loading and curing a plurality of endless belts in a plurality of endless parallel spaced cavities having the open sides thereof facing inwardly, which includes the steps of positioning the belts on an expansible wall in the same spaced relation as the cavities, positioning the wall with the spaced belts thereon in alignment with the respective cavities in which they are to be cured, applying an outwardly directed uniformly distributed force to the inner walls of the belts normal thereto at all points, forcing them outwardly into the cavities, and subjecting the belts to a curing temperature while applying the uniformly distributed force.

JAMES A. HURRY.
ERNEST NASSIMBENE.

REFERENCES CITED

The following references are of record in the file of this patent:

UNITED STATES PATENTS

| Number | Name | Date |
| --- | --- | --- |
| 890,049 | Cox | June 9, 1908 |
| 1,899,393 | Meyer | Feb. 28, 1933 |
| 2,253,792 | Leavenworth | Aug. 26, 1941 |